(No Model.)
L. W. FREE.
WHEELWRIGHT'S CLAMP.
No. 336,633. Patented Feb. 23, 1886.
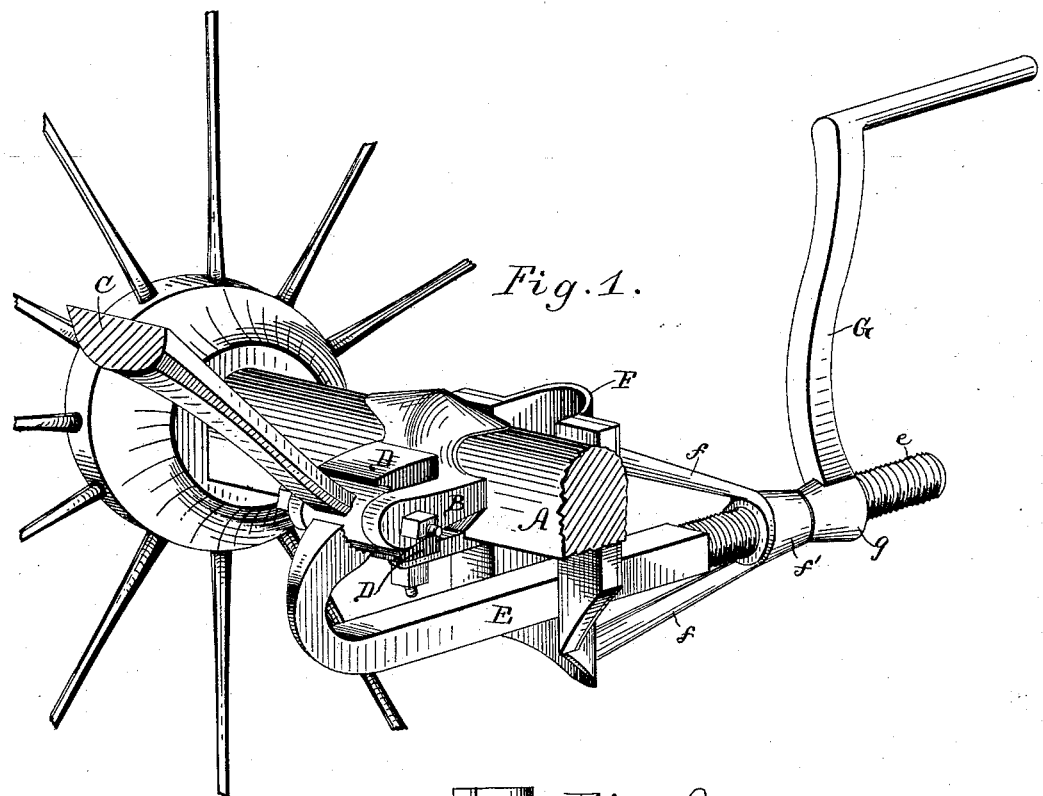
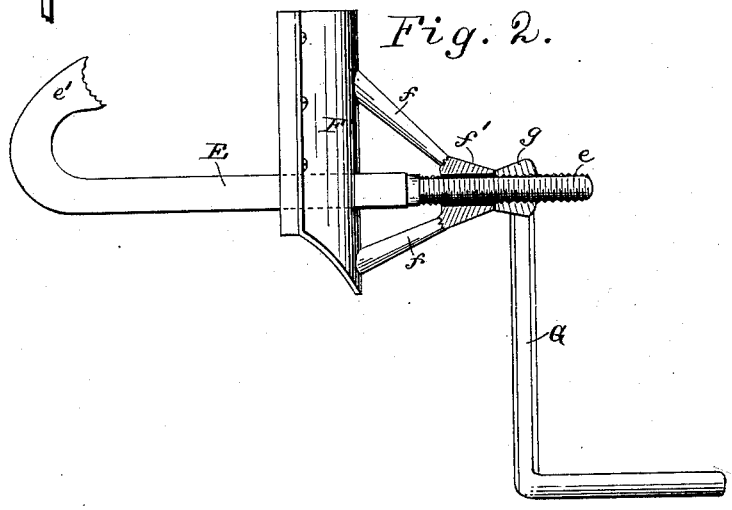
WITNESSES
Thos. Houghton.
Frank B. Marlow.
INVENTOR
Lewis W. Free
By Wm. Conard,
Attorney

UNITED STATES PATENT OFFICE.

LEWIS W. FREE, OF CHEYNEY, PENNSYLVANIA.

WHEELWRIGHT'S CLAMP.

SPECIFICATION forming part of Letters Patent No. 336,633, dated February 23, 1886.

Application filed December 17, 1885. Serial No. 185,902. (No model.)

*To all whom it may concern:*

Be it known that I, LEWIS W. FREE, a citizen of the United States, residing at Cheyney, in the county of Delaware and State of Pennsylvania, have invented certain new and useful Improvements in Wheelwrights' Tools; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to the class of wheelwrights' tools; and its object is to facilitate the insertion, removal, or readjustment of the rubber spring habitually used in connection with a thill-coupling.

In the accompanying drawings, wherein like letters represent like parts, Figure 1 is a perspective of the tool applied to a thill-coupling for the purpose of removing the rubber spring; and Fig. 2 a side elevation, partly in section, of the tool.

A is the axle of a carriage or wagon. B is the thill-coupling. C is one of the shafts, and D is the rubber spring.

E is the shank of the tool, with screw-thread $e$ at the upper end and the lower end formed into a toothed jaw, $e'$. Upon this shank slides the clamp F, steadied by the braces $f\,f$ and the collar $f'$. A lever, G, having a spiral-threaded eye, $g$, operates this clamp.

To work the device when a rubber spring is to be inserted, detach the shaft, put the rubber block in place between the arms of the thill-coupling, put the shaft in position, and apply the jaw of the tool to the swell made by the eye of the shaft, as shown in Fig. 1. The clamp F then bears against the opposite side of the axle, and the recessed form given to the middle part of its face accommodates it to any ordinary breadth or thickness of the collar of the thill-coupling. By turning the lever G to the right the rubber spring will be so compressed that the bolt connecting the shaft to the coupling may be inserted and the connection made.

The tool may be removed by reversing the motion of its lever. The spring may be removed by a similar operation, as must be apparent to every wheelwright.

Having thus described my invention, what I claim to be new and useful, and desire to secure by Letters Patent, is the following:

A wheelwright's tool consisting in the combination of the shank E, having a stem, $e$, and the serrated clamping-jaw $e'$, with the clamp F, having braces $f$, and a collar, $f'$, upon the screw-threaded end of the shank, and the lever G, having an eye, $g$, meshing with the screw-threaded end of the shank, in the manner and for the purposes described.

In testimony whereof I affix my signature in presence of two witnesses.

LEWIS W. FREE.

Witnesses:
  MILTON LEWIS,
  THOMAS LEES.